May 28, 1935.  K. F. MOLLER  2,002,705
APPARATUS FOR FORMING ARTICLES
Filed Oct. 28, 1932  3 Sheets-Sheet 1
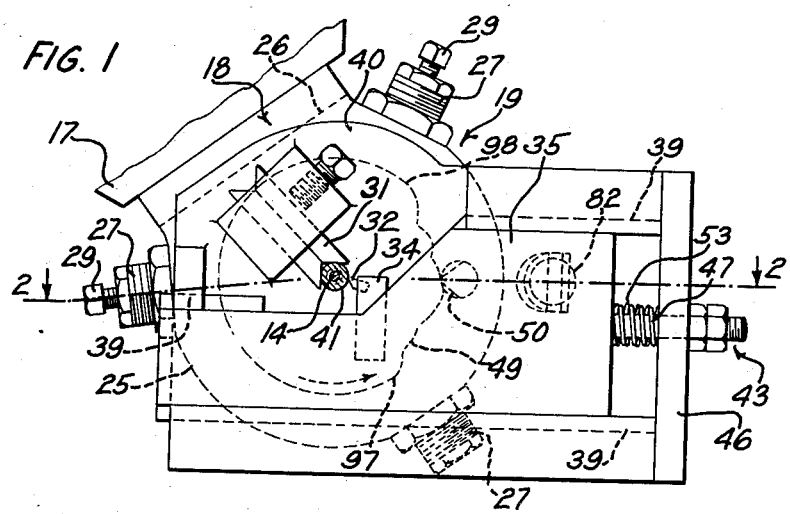
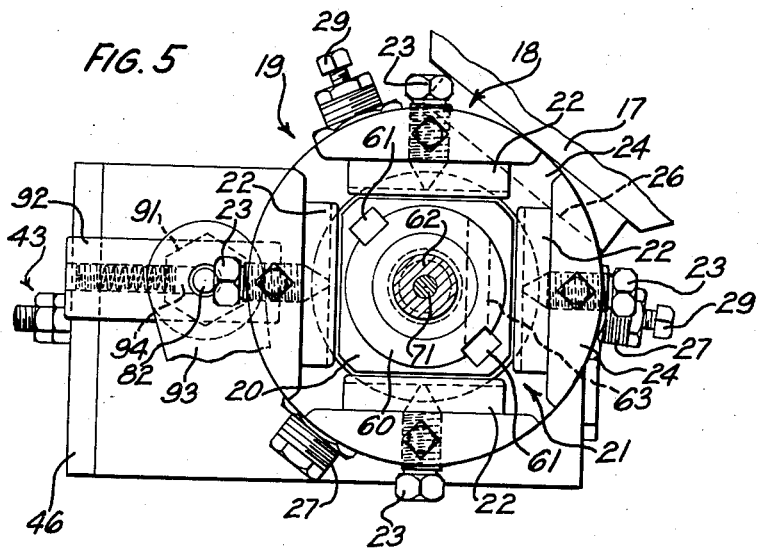
INVENTOR
K. F. MOLLER
BY H. A. Whitehorn
ATTORNEY May 28, 1935. K. F. MOLLER 2,002,705
APPARATUS FOR FORMING ARTICLES
Filed Oct. 28, 1932 3 Sheets-Sheet 2
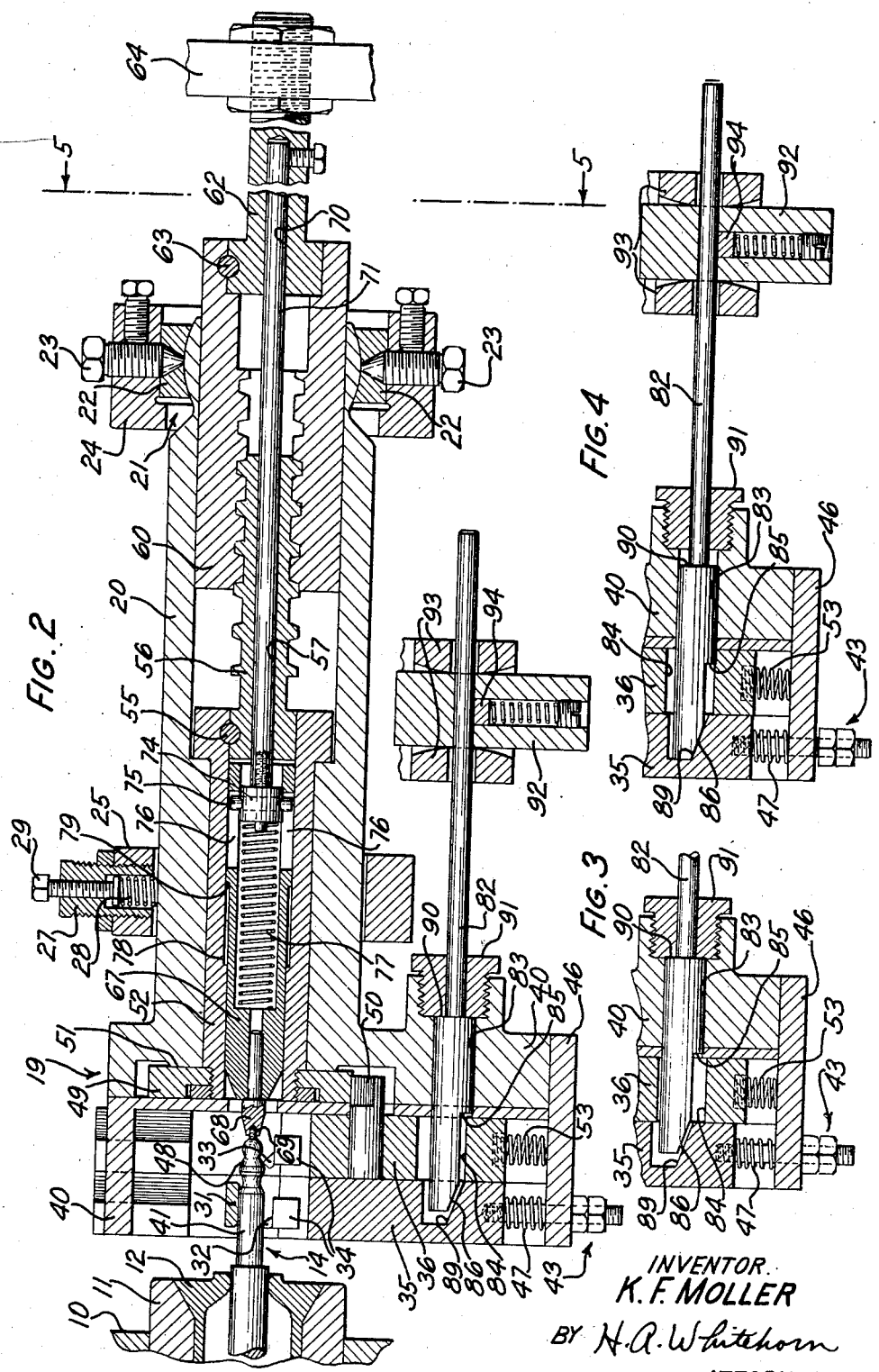
INVENTOR.
K. F. MOLLER
BY H. A. Whitehorn
ATTORNEY

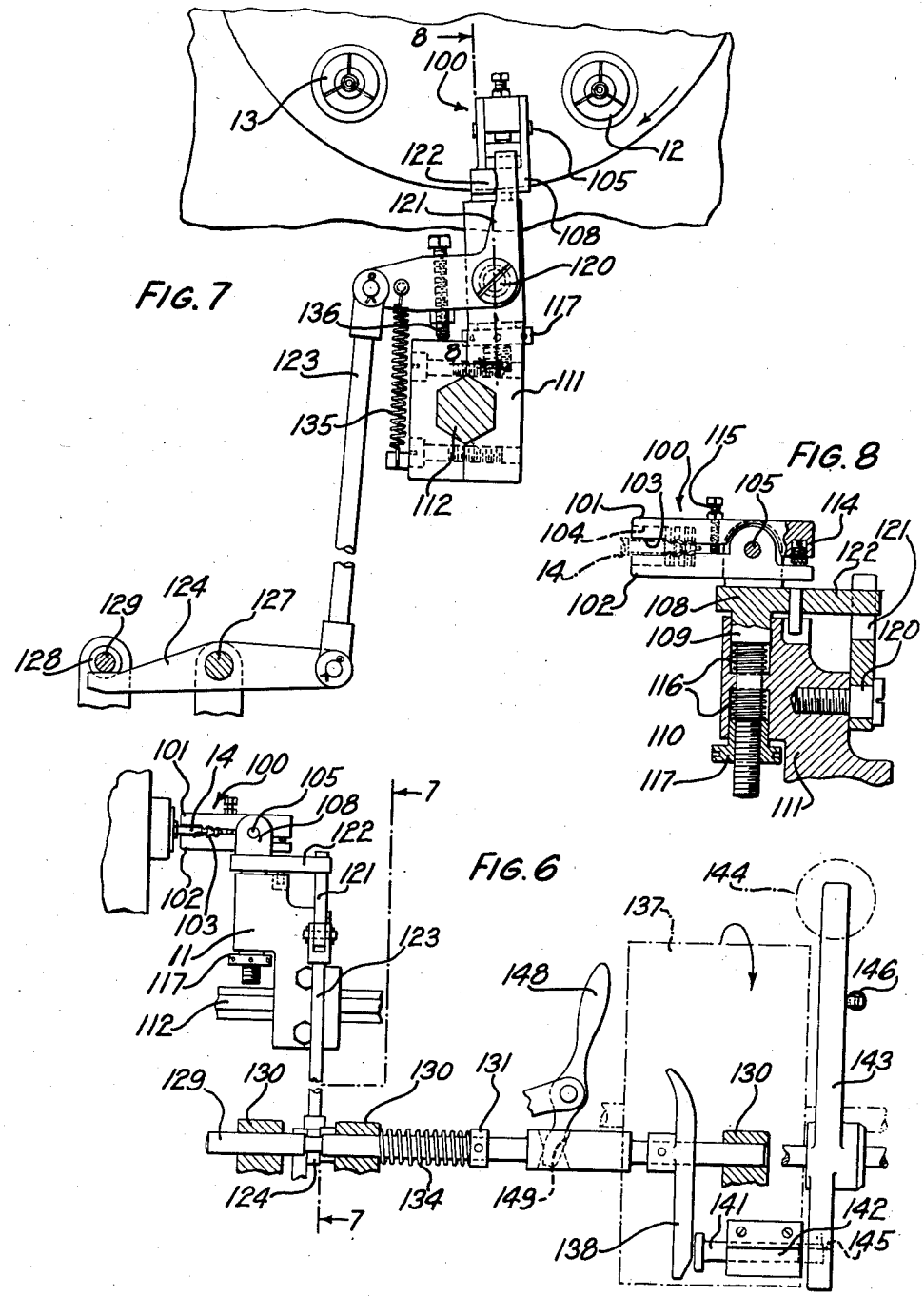

Patented May 28, 1935

2,002,705

UNITED STATES PATENT OFFICE 2,002,705

APPARATUS FOR FORMING ARTICLES

Kasper F. Moller, Cicero, Ill., assignor to Western Electric Company, Incorporated, New York, N. Y., a corporation of New York Application October 28, 1932, Serial No. 640,043

16 Claims. (Cl. 29—57)

This invention relates to apparatus for forming articles, and more particularly to automatic screw machines.

An object of the invention is to provide an improved article forming apparatus whereby articles of uniform contour and dimensions may be produced efficiently in large quantities, and with a minimum amount of manual effort.

In accordance with one embodiment of this invention as applied to the production of highly accurate contours, a conventional multiple spindle automatic screw machine is provided with a profiling attachment mounted on the usual tool slide of the machine, and movable thereby longitudinally of the rotating work at one of the positions of the work holding spindles. The profiling attachment includes a cutting or profiling tool mounted for movement radially of the work by means of a rotatable cam coaxial with the work, the cam being rotated through the reciprocable movement of the tool slide. Means is provided whereby the profiling tool is accurately self-centered with respect to the work at all times, regardless of the usual slight variations in the positions of the axes of the several work holding spindles when at the working position of the profiling attachment. Means is also provided for withdrawing the profiling tool radially away from the work upon the completion of the profiling operation to prevent marring the finished work during the longitudinal return movement of the tool. An automatic stop mechanism is provided which comprises a gauge or pivoted member positioned to be actuated by oversize or defective parts while being indexed to the profiling position, the actuation of the pivoted member serving to stop the machine, thereby preventing further operations on defective parts and eliminating tool breakages.

Other features and advantages of this invention will more fully appear from the following detailed description taken in connection with the accompanying drawings, wherein Fig. 1 is an elevational view of the forward end of a profiling tool embodying the features of this invention shown applied to the tool slide of an automatic screw machine;

Fig. 2 is a plan section taken on the line 2—2 of Fig. 1, showing fragmentarily one of the work holding spindles of a conventional multiple spindle automatic screw machine, the profiling tool being shown in an intermediate position in its forward working stroke;

Fig. 3 is a fragmentary sectional view of a portion of the structure shown in Fig. 2 showing the position of the tool withdrawing means relative to the tool slides at the end of the forward working stroke of the tool;

Fig. 4 is a fragmentary sectional view similar to Fig. 3, but showing the position of the tool withdrawing means relative to the tool slides during the return or idle movement of the tool;

Fig. 5 is a vertical section taken on the line 5—5 of Fig. 2 looking at the rear end of the attachment;

Fig. 6 is a fragmentary side view of the automatic stop mechanism;

Fig. 7 is a vertical section on an enlarged scale taken on the line 7—7 of Fig. 6, showing the position of the stop mechanism gauge in the line of travel of the articles while being indexed to the profiling position, and Fig. 8 is a vertical detail section taken on the line 8—8 of Fig. 7.

The invention is herein illustrated and described as applied to a conventional multiple spindle screw machine, and more particularly to a novel adaptation of such a machine to the automatic forming and/or profiling of articles requiring accurate contours and highly finished surfaces, such as switchboard plugs. It should be understood, however, that the novel features of the invention are capable of numerous other applications.

Referring now to the drawings, and more particularly to Figs. 1 to 5, inclusive, it will be observed that the numeral 10 designates a portion of the rotatable spindle head of a conventional multi-spindle screw machine. A plurality of equally spaced work holding spindles 11 are rotatably carried in the head 10, each spindle terminating in a chuck 12 designed to receive and securely clamp therein one end of a partially formed switchboard plug 14. A portion of the usual tool carrying slide employed in screw machines of this type is designated by the numeral 17. By mechanism well known in the art, the tool carrying slide is periodically advanced toward the work holding spindles and in timed relation with respect to the intermittent indexing of the spindles to successive positions. Also, at one of the positions of the spindles, the partially formed plugs or other blanks to be formed are loaded into the spindle chucks either manually or automatically from a magazine, and the completely formed plugs are ejected from the spindle chucks automatically, all in a manner well known in the art and constituting no part of the present invention.

A profiling attachment 19 is mounted upon the tool slide 17 by means of a bracket 18 attached to the slide. This profiling attachment is in the form of a box tool comprising a cylindrical housing 20 supported at its right end in the bracket 18 by a universal joint 21 (Figs. 2 and 5). The universal joint includes four shoes 22 having arcuate inner faces conforming to similar faces formed on the outer peripheral surface of the housing 20, the shoes being held in position by set screws 23 threaded into a ring-like portion 24 of the bracket 18 which surrounds the housing 20, the set screws engaging depressions in the shoes. At its left end the housing 20 is also surrounded by a ring-like portion 25 of the bracket 18, the inner diameter of this ring-like portion being larger than the outer diameter of the housing to provide a suitable clearance therebetween. It is to be understood that the ring-like portions 24 and 25 of the bracket 18 are integrally united by a flat interconnecting portion 26, the inner face of which is indicated in dotted lines in Figs. 1 and 5, the outer face of the portion 26 abutting the tool slide 17.

Threaded into the ring-like portion 25 and spaced 120° apart are three bushings 27 housing springs 28, one of which is shown in detail in Fig. 2, the springs at their inner ends engaging the peripheral surface of the housing 20. The tension of the springs 28 in the two upper bushings 27, as viewed in Fig. 1, are adjustable by means of screws 29, as shown in detail in Fig. 2, and these springs normally tend to cause the housing 20 to rest against the inner end of the third bushing 27, which may be suitably adjusted by turning it in or out in the bracket 18 to limit the movement of the housing 20 at its left end toward the inner peripheral surface of the bracket 18.

The design of the universal joint 21 is such that the housing 20 is prevented from longitudinal or torsional movement relative to the bracket 18, yet can float at one end within the space between the housing and bracket limited by the adjustment of the screws 29 and the associated springs 28 and the third bushing 27 and its associated spring.

Adjustably carried at the forward end of the housing 20 is a V-grooved steady rest 31 adapted to slidably engage the straight cylindrical portion 41 of the plugs under the pressure of the springs 28 to thereby accurately position the forming tools with respect to the work, regardless of the usual slight variations in the positions of the axes of the plugs when at the working position of the forming tools. By adjusting the tension of the springs 28 by means of the screws 29 the pressure of the steady rest 31 on the plug 14 may be varied to an amount just sufficient to insure the engagement of the steady rest with the plug at all times.

The forming tools 32 and 33, in the present application of the invention, comprise diamonds suitably mounted in the holders 34 carried in slides 35 and 36, respectively, (Fig. 2), the slides being mounted for reciprocation at right angles to the axis of the plug in suitable slide ways 39 (Fig. 1) formed in a head portion 40 of the housing 20. The diamond tool 32 is for finishing the peripheral surface of a straight sleeve portion 41 of the plug 14 and the slide 35 upon which it is mounted is provided with an adjustable stop 43 comprising a screw threaded into one end of the slide and extending freely through an aperture of an end plate 46 fixed to the housing 20 and spaced from the slides, the outer end of the screw carrying a pair of adjusting nuts. Surrounding the screw of the adjustable stop 43 with opposite ends abutting the plate 46 and the tool slide 35 is a compression spring 47 which serves to hold the tool 32 in its operative position against the rotating plug 14 to finish the straight sleeve portion 41 thereof, the movement of the tool toward the plug and consequently the depth of the finishing operation thereon being limited by the adjustable nuts of the stop 43.

The diamond tool 33 is for finishing the peripheral surface of an irregular or profile portion 48 of the plug 14 and the slide 36 upon which it is mounted obtains a predetermined profiling movement from a rotary profiling cam 49 which peripherally engages a cam rider 50 fixed to the slide 36. The contour of the peripheral cam face of the cam 49 is shown in dotted outline in Fig. 1. The profiling cam 49 is mounted in the head 40 of the housing 20 and abuts an annular thrust bearing 51 (Fig. 2) formed integral with the housing and surrounding a hollow driving spindle 52 for the profiling cam. The cam rider 50 is constantly urged into engagement with the peripheral cam face of the cam 49 during the profiling operation of the tool 33 on the plug 14 by a compression spring 53 positioned between the plate 46 and the tool slide 36.

The spindle 52 is journaled in the left end of the housing 20 and at its outer end extends into the head portion 40 of the housing and to this end of the spindle is suitably fixed the profiling cam 49. Secured by a pin 55 to the inner end of the spindle 52 is a coarse threaded screw 56 formed with a central longitudinal bore 57. Engaging the screw 56 is a stationary nut 60 which fits the bore of the housing 20 and is prevented from turning therein by keys 61 (Fig. 5), the nut being rigidly secured to the stationary frame of the automatic screw machine by a rod 62, one end of which is pinned to the nut, as indicated at 63. The opposite end of the rod 62 extends through a stationary lug 64 of the machine frame and is held rigid thereto after adjustment by nuts threaded onto the rod at opposite sides of the lug.

It will be apparent that during the forward working stroke of the box tool 19, the nut 60 will be held stationary from longitudinal and rotary movement by the fixed rod 62 pinned thereto, the housing 20 of the box tool carried by the tool slide 17 will slidably move forward on the nut, and the profiling cam 49 will likewise be moved forward due to the thrust of the bearing 51 on the housing 20 thereagainst. The forward movement of the profiling cam 49 carries the attached spindle 52 therewith and the spindle in turn draws the coarse threaded screw 56, which is fixed to the spindle, along the threaded interior of the nut 60 which causes the screw, spindle and profiling cam to rotate in the direction of the arrow (Fig. 1). Upon a retraction of the housing 20, the reverse movements of the moving parts occur.

During the forward working stroke of the box tool 19 the forming tools 32 and 33 will operate on the straight sleeve portion 41 and the irregular or profile 48 of the rotating plug 14, respectively. As shown in Fig. 2, the box tool 19 has partly completed its forward working stroke and consequently the tools 32 and 33 are shown in operative relation with the rotating plug 14, the tool 32 being held against the peripheral surface of the plug during its movement therealong by the spring of the adjustable stop 43 and the tool 33 having imparted thereto a predetermined profiling motion during its movement along the plug from the rotary movement of the profiling cam 49, which engages the cam rider 50 connected to the tool slide 36.

The unfinished outer end of the rotating plug 14 (Fig. 2) is centrally supported during the operation of the tools 32 and 33 thereon by a spring pressed shouldered sleeve 67 reciprocably mounted in the bore of the hollow driving spindle 52. The forward end of the sleeve carries a nose piece 68 having its outer flat end face provided with a depression 69 for receiving the unfinished end of the plug as the box tool 19 is advanced toward the plug carried in the spindle head 10. Fixed in a longitudinal central aperture 70 of the rod 62 is a rod 71 which freely extends through the bore 57 of the screw 56 and into the bore of the sleeve 67. To the forward end of the rod 71 is fixed a head member 74 which slidably fits the bore of the sleeve 67, the head member 74 being equipped with a transverse pin 75 projecting at opposite ends into slots 76 formed longitudinally in the sleeve 67. A compression spring 77 within the bore of the sleeve 67 engaging at opposite ends the stationary head member 74 and the forward end wall of the bore of the sleeve normally acts to slide the sleeve forward, which movement is limited by the stationary pin 75 engaging the inner ends of the slots 76, the arrangement being such that the nose piece 68 is prevented from going into the path of the profiling diamond tool 33 in case a plug 14 is not held in the aligned chuck of the spindle head 10, thus damage to the cutting edge of the diamond tool is prevented. During the retraction or return stroke of the box tool 19 after operating on a plug 14 an inner annular shouldered surface 78 on the spindle 52 engages a similar outer surface 79 on the sleeve 67 and in the continued movement of the box tool the sleeve and its nose piece 68 is moved inwardly relative to the spindle 52, thereby removing the nose piece 68 from supporting relation with the plug so that the plug is free to be indexed to the next work station by the movement of the spindle head 10. In the next forward working stroke of the box tool 19 the shoulder 78 on the spindle 52 moves away from the shoulder 79 on the sleeve 67 which permits the spring 77 to move the sleeve and the nose piece 68 forward relative to the box tool 19 so that the nose piece is moved into operative supporting relation with the outer end of the plug 14 before the tools 32 and 33 moving with the box tool engage the plug to operate thereon. Thereafter the sleeve 67 is moved rearwardly in the spindle 52 as the box tool 19 continues its working stroke.

It is desirable that no tool marks appear on the straight and irregular or profile portions 41 and 48 of the plug 14 after the finishing operations thereon by the diamond tools 32 and 33, respectively, and during the retraction or return stroke of the tools with the tool slide 17. Means is therefore provided for automatically withdrawing or releasing the tools 32 and 33 from engagement with the finished surfaces of the plug 14 at the end of the profiling operation during the forward working stroke in the case of the profiling tool 33 and immediately upon the beginning of the return stroke in the case of the sleeve finishing tool 32.

The means for releasing the tools 32 and 33 referred to above comprises a shouldered generally cylindrical rod 82, (Figs. 2 and 5), having an enlarged forward end which slidably fits in an aperture 83 of the housing head 40 of the box tool 19. The forward end of the rod extends freely through a suitable aperture 84 in the profiling tool slide 36 and is provided with a step or shoulder 85 which forms right angle flat faces on the rod and consequently a reduced portion for a predetermined distance from the forward flat end face of the rod. The extreme forward end of the rod 82 is provided with a tapered or cam face 86 of a suitable length which extends from the flat end face of the rod to the plane of the longitudinal flat face formed by the shoulder 85 thereof. Formed in the tool slide 35 carrying the diamond tool 32 for finishing the straight sleeve portion 41 of the plug 14 is a depression into which the forward end of the rod 82 extends, the surrounding wall of the depression being provided with a cam face 89 which cooperates with the cam face 86 of the rod in the operation of the apparatus. The longitudinal movement of the rod 82 is limited in a forward direction by its engagement with the inner end wall of the depression 89 and in a rearward direction by a shoulder 90 thereof engaging an adjustable bushing 91 threaded into an enlargement on the housing head 40 of the box tool 19. At its rear end the rod 82 extends through a friction device universally mounted at its rear end on a stationary part of the screw machine. The friction device comprises an apertured block 92, mounted for universal movement between stationary lugs 93 of the screw machine, the rod 82 having a sliding fit in the block, and freely extending through apertures in the lugs. The periphery of the rod 82 in the block 92 is engaged by an adjustable spring pressed shoe 94 to provide a suitable braking action on the rod which serves to permit a relative movement between the tool slides 35 and 36 and the rod 82 at the beginning of the forward working and return strokes of the box tool 19.

The operation of the tool releasing means, assuming that the box tool 19 is partly advanced through its forward working stroke, as shown in Fig. 2, is as follows. At this point in the advance of the box tool 19 the rod 82 is caused to advance therewith due to the bushing 91 movable with the box tool engaging the shoulder 90 of the rod 82, and consequently the friction of the shoe 94 on the rod is overcome. Upon completion of the profiling operation on the portion 48 of the plug 14 the cam rider 50 is moved outwardly relative to the axis of the profiling cam 49. This occurs when point 97 (Fig. 1) on the concentric outer surface of the cam 49 moves into engagement with the cam rider, the cam being rotated in the direction of the arrow. The movement of the cam rider 50, it will be apparent, moves the slide 36 and thereby, withdraws the diamond tool 33 carried thereby from engagement with the portion 48 of the plug 14, the movement being sufficient also to move the tool 33 a suitable distance outside the diameter of the straight sleeve portion 41 of the plug. The relative positions of the tool slide 36 and the rod 82 upon completion of the profiling operation of the tool 33 is shown in Fig. 3. This figure also shows the relative positions of the tool slide 35 and the rod 82 upon completion of the operation of the tool.

The box tool 19 continues its forward stroke until the diamond tool 32 completes its operation on the straight sleeve portion 41 of the plug and the return stroke then begins. As the box tool 19 moves rearwardly, the rod 82 (Fig. 3) is held stationary by the friction shoe 94 until the space between the inner end wall of the depression in the tool slide 35 carrying the tool 32 and the forward flat end face of the rod is closed as is shown in Fig. 4. Immediately upon the box tool 19 starting its rearward or return movement the tool slide 35 is moved outwardly from the axis of the plug 14 due to the cam face 89 thereof riding into engagement with the cam face 86 of the rod 82 and consequently the diamond tool 32 carried by the slide is withdrawn from engagement with the portion 41 of the plug. With the closing of the space between the inner end wall of the depression in the tool slide 35 and the forward flat end face of the rod 82 a similar space (Fig. 4) is provided between the shoulder 90 of the rod and the bushing 91. Also it will be observed that the shoulder 85 of the rod 82 has been moved forwardly relative to the tool slide 36 so that the larger diameter of the rod 82 is positioned inside the aperture 84 of the tool slide. During the rearward movement of the box tool 19 the profiling cam 49, it will be understood, will be rotated in the opposite direction to that indicated by the arrow in Fig. 1 due to the rearward movement of the screw 56 in the stationary nut 60. The profiling cam face of the cam 49 will consequently be rotated past the cam rider 50, the concentric outer surface of the cam at the point 97 moving away from the cam rider, but due to the position of the shoulder 85 of the rod 82 which is at this time inside the aperture of the tool slide 36 the tool slide will move inwardly only a slight distance and engage the larger diameter of the rod, as is clearly shown in Fig. 4. In this last position of the tool slide 36 the diamond tool 33 will still be held out of engagement with the profiled portion 48 of the plug 14. The tool slides 32 and 33 and the rod 82 maintain their relative positions, as shown in Fig. 4, during the return stroke of the box tool 19 until the cam rider 50 engages point 98 (Fig. 1) of the concentric outer surface of the cam 49 at the end of the stroke whereupon the tool slide 36 is moved outwardly a slight distance from the larger diameter of the rod 82. Upon the box tool 19 again moving forwardly to operate on the next plug 14 indexed into position the rod 82 is held stationary by the friction shoe 94 until the space between the shoulder 85 and the bushing 91 is closed, as shown in Fig. 2, the tool slides 35 and 36 and the rod then moving inwardly to carry the diamond tools 32 and 33, respectively, into operative position for operating on the plug 14 in the further advance of the box tool 19. As hereinbefore described the inward movement of the tool slide slide 35 is limited by the adjustable stop 43 which determines the depth of cut on the sleeve portion 41 of the plug and the profiling movement of the tool slide 36 is determined by the peripheral cam face of the rotating cam 49 riding on the cam rider 50 fixed to the slide 36.

In order to prevent the production of defective parts and eliminate damage to the above described forming tools by their engagement with oversize or defective partially formed plugs, mechanism is provided for automatically stopping the machine when a defective or oversize partially formed plug is indexed to the working position of the forming tools. This mechanism includes a gauge or pivoted member 100 positioned to be actuated by defective or oversize plugs while being indexed to the working position of the forming tools. The pivoted gauge member 100 comprises a pair of jaw members 101 and 102 constructed and arranged to provide an opening 103 therebetween conforming to the size and contour of a satisfactory partially formed plug prior to being operated upon by the forming tools.

The sides of the jaw members 101 and 102, facing the approaching plug 14, along the opening 113 are relieved or shaped as indicated in dotted outline in Fig. 8 to provide a mouth 104 to facilitate entrance of the plug into the gauge opening 113. The jaw members 101 and 102 are horizontally pivoted as indicated at 105 (Fig. 8) to a bifurcated upper end of a member 108 provided with a shouldered stem 109 vertically pivoted and freely slidable in a shouldered aperture 110 of an irregular shaped bearing block 111 clamped to a stationary rod 112 of the machine. A compression spring 114 positioned between the jaw members 101 and 102 at the right side of the pivot 105 thereof (Fig. 8) normally urges the jaw members toward each other, this movement being limited by an adjustable stop screw 115 threaded through the member 101 and engaging the member 102. Abutting opposite faces of a shoulder provided along the aperture 110 of the block 111 and surrounding reduced portions of the stem 109 of the member 108 are compression springs 116, the opposite ends of the springs engaging a shoulder formed on the stem and an adjustable shouldered nut 117 screw threaded onto the lower end of the stem and freely slidable in the aperture 110. It will be apparent that the gauge member 100 as a whole is free to swing in a horizontal direction about the axis of the stem 109 and is yieldably mounted for movement in a vertical direction along the aperture 110, its vertical movement being limited in opposite directions by the shoulder on the nut 117 and the lower surface of the upper end of the member 108 engaging opposite ends of the bearing block 111. The resistance of the gauge member 100 to vertical movement on the block 111 it will be obvious may be adjusted by turning the nut 117 on the stem 109. In addition the jaw members 101 and 102 may move about their pivot 105.

Pivoted, as indicated at 120, to the block 111 is a bell crank lever 121 having a vertical arm thereof abutting the right side (Fig. 8) of an arm 122 of the member 108 and a horizontal arm pivoted to the upper end of a link 123, the lower end of the latter being pivoted to one end of a trip lever 124 pivoted at 127. The free end of the trip lever 124 normally engages a reduced shouldered portion 128 of a rod 129 mounted for reciprocable movement in bearings 130 provided on the frame of the screw machine. Surrounding the rod 129 between one of the bearings 130 and a collar 131 fixed to the rod is a compression spring 134 which normally urges the rod 129 towards the right (Fig. 6), the rod being held from thus moving due to the engagement of the free end of the trip lever 124 in the shouldered portion 128 of the rod as shown in Figs. 6 and 7. A tension spring 135 (Fig. 7) attached to the horizontal arm of the bell crank lever 121 normally acts to hold the trip lever 124 in holding position relative to the rod 129, and an adjustable stop screw 136 threaded into the horizontal arm of the bell crank lever 121 and abutting a stationary surface (Fig. 7) provides means for adjusting the sensitivity of engagement of the trip lever 124 with the shoulder 128 of the rod 129.

The right end of the rod 129 (Fig. 6) extends across the front of a cam drum 137, shown in broken lines. Fixed to the rod 129 in front of the cam drum 137 is a double ended arm 138 which normally is positioned out of the path of a headed pin 141 reciprocably mounted in a bearing block 142 attached to the peripheral surface of the cam drum. Adjacent the right end of the cam drum 137 is a clutch operating lever 143 suitably pivoted on the screw machine frame forward of the longitudinal axis of the rod 129. The upper end of the lever 143 at its rear side is operatively associated with a cone type friction clutch indicated in general at 144 (dotted outline Fig. 6) and the lower end of the lever is provided with a curved rearwardly extending portion 145

(dotted line Fig. 6) which is engaged by the pin 141 revolving with the cam drum 137 when the pin is in its dotted line position. At its upper end the lever 143 is lightly held in engagement with the clutch 144 by a suitable tension spring 146. The engagement of the pin 141 with the portion 145 of the lever 143 as the pin moves thereby rocks the lever sufficiently to cause its upper end to actuate the cone friction clutch 144, thereby stopping the screw machine.

Since the cam drum 137 and clutch 144 are well known parts of conventional screw machines of the type above referred to, it is believed that the schematic illustration thereof is sufficient to a complete understanding of the present invention.

A pivotal hand lever 148 is operatively connected to an enlargement of the rod 129, the lower end of the lever extending into a suitably shaped aperture 149 of the enlargement so that after an actuation of the stop mechanism to stop the screw machine, the rod 129 may be manually shifted to the left (Fig. 6) to reset the trip lever 124 in the shouldered portion 128 thereof. At this time the pin 141 is also manually shifted on the cam drum 137 to its full line position. The lower end of the hand lever 148 engaging in the aperture 149 of the enlargement of the rod 129 also serves to prevent the rod from rotating in its bearings 130. Consequently, the arm 138 attached to the rod 129 will be held in a predetermined position relative to the path of the pin 141 revolving with the cam drum 137.

In the operation of the screw machine and during the indexing of the partially formed plug 14 to the next operating position or forming tools, in the present instance, the box tool 19, the portion of the plug extending from the chuck 12 will pass through the previously described opening 103 of the gauge 100 if the plug is not defective as to size and contour and thereby not interrupt the operation of the machine. If one or more portions of the plug 14 are oversize, the plug will not pass freely through the gauge opening 103 and consequently the engagement of the moving plug with the gauge members 101 and 102 will rock their supporting member 108 about its vertical pivot. The movement of the member 108 by means of the arm 122 thereof abutting the vertical arm of the bell crank lever 121 withdraws the trip lever 124 from holding engagement with the shouldered portion 128 of the spring loaded rod 129 and the latter is projected toward the right (Fig. 6). At this instant if the pin 141 carried by the rotating cam drum 137 is not in position to be engaged by the double ended lever 138 the movement of the rod 129 will be limited by the lever engaging the adjacent bearing 130 and immediately thereafter the pin 141 rotating with the cam drum is revolved into engagement with the upper curved end of the lever 138 and thereby moved longitudinally toward the right in its bearing block 142, the right end of the pin then being positioned in the path of the curved rearwardly extending portion 145, which is shown in dotted lines in Fig. 6, of the clutch operating lever 143. When this longitudinal movement of the pin 141 occurs, the pin is only slightly spaced from the portion 145 of the lever 143 so that it instantly engages the lever and rocks it about its pivot, whereby the upper end of the lever actuates the cone friction clutch 144 to stop the machine.

In case the plug 14 is only slightly oversize but still within a permissible limit, the jaw members 101 and 102 will yield and move about their pivot 105 to permit the passage of the plug to the forming tools without interrupting the operation of the machine. Furthermore, the yieldable mounting in a yieldable mounting in a vertical direction of the stem 109 of the supporting member 108 which carries the jaw members 101 and 102 permits the jaw members to move bodily in a vertical direction so that the gauge will automatically adjust itself to the individual position of the plug 14 which may vary due to usual slight variations in the positions of the work holding spindles and chucks.

It is believed that the operation of the above described apparatus embodying the features of the present invention will be clearly understood from the above detailed description. It is obvious, of course, that the novel features of the invention are not limited to the specific applications thereof herein illustrated and described, but may be capable of numerous other applications within the scope of the appended claims.

What is claimed is:

1. In an article forming apparatus, a forming tool, means for moving an article into operative relation with respect to said tool, and means including spaced members between which said article is moved positioned in advance of said tool and under the control of said article during its movement towards said tool for controlling the operation of said tool.

2. In an article forming apparatus, a forming tool, means for intermittently advancing successive articles into operative relation with respect to said tool, and means including spaced members between which said articles are moved positioned in advance of said tool and under the control of the articles during their respective advancements toward the tool for controlling the operation of the tool.

3. In an article forming apparatus, a forming tool, a clutch for controlling the operation of said tool, means for moving an article into operative relation with respect to said tool, and means including spaced members between which said article is moved positioned in advance of said tool and responsive to a dimension of said article during its movement towards said tool for controlling said clutch.

4. In an article forming apparatus, a forming tool, means for advancing articles successively into operative relation with respect to said tool, and a gauge member positioned in advance of said tool and in the path of movement of said articles and responsive to a dimension of the articles during their movements towards said tool for controlling the operation of said tool when said dimension is abnormal and ineffective to control the operation of said tool when said dimension is normal.

5. In an article forming apparatus, article forming means, means for moving successive articles into operative relation with respect to said forming means, and control means including spaced members between which said articles are moved positioned in advance of said forming means and in the path of movement of said articles for controlling the operation of said forming means, said control means being rendered effective only by articles differing from a predetermined standard for preventing the operation of said forming means thereon.

6. In an article forming apparatus, article forming means, means for moving successive articles into operative relation with respect to said forming means, a gauge member positioned in the path of the moving articles and having an opening therein for permitting the free passage therethrough of articles of a predetermined size and contour, and means actuated by the gauge member upon the engagement therewith of an article of different size or contour for interrupting the operation of the forming means.

7. In an article forming apparatus, article forming means, means for moving successive articles into operative relation with respect to said forming means, a gauge member pivotally mounted in the path of movement of said articles, said gauge member having an opening for the passage therethrough of articles of a predetermined size without moving the gauge member but preventing the passage therethrough of articles of a different size and contour, whereby continued movement of such articles moves the gauge member about its pivot, and means responsive to said movement of the gauge member for interrupting the operation of the forming means.

8. In a multiple spindle screw machine, the combination with article forming means, a plurality of article holding spindles and means for successively indexing said spindles into operative relation with respect to said forming means, of means including spaced pivotal elements between which said articles are moved positioned in advance of said forming means in the path of articles during their advancement by the spindles toward the forming means for controlling the operation of the forming means.

9. In an article forming apparatus, relatively rotatable and longitudinally movable article and tool supporting members, a tool carried by the tool supporting member and movable therein radially of the article supporting member, a rotatable cam for controlling the radial movement of the tool, a stationary element coaxial with said cam, and means operatively associated with said stationary element and responsive to a relative longitudinal movement of the article and tool supporting members for imparting a rotary motion to the cam.

10. In an article forming apparatus, means for supporting and rotating an article, a forming tool carrier mounted for longitudinal movement toward and away from the article, a forming tool slidably mounted on the carrier for movement radially of the article, a rotatable cam for controlling the radial movement of the forming tool, a stationary element coaxial with said cam, and means operatively associated with said stationary element and responsive to a longitudinal movement of the carrier for imparting a rotary motion to the cam.

11. In an article forming apparatus, means for supporting and rotating an article, a tool carrier movable longitudinally of the axis of rotation of the article, a tool mounted on the carrier for movement radially of the article, means including a rotary element for imparting a radial movement to the tool, a stationary element coaxial with said rotary element and means operatively associated with said stationary element and responsive to a longitudinal movement of the tool carrier for imparting a rotary movement to the rotary element.

12. In an article forming apparatus, means for supporting and rotating an article, a forming tool movable longitudinally and radially of the article, means for moving the tool in one direction longitudinally of the article and simultaneously imparting a movement of the tool radially of the article into operative engagement therewith, and means for moving the tool radially of the article to disengage it from the article upon the completion of the forming operation and for holding said tool out of engagement with the article during the return longitudinal movement of the tool.

13. In an article forming apparatus, means for supporting and rotating an article, a tool carrying slide, means for advancing the slide longitudinally of the axis of rotation of the article, a tool carried by the slide, a stationary threaded element, and rotatable means having a threaded portion engaging the stationary threaded element and movable with the tool slide during its advance movement and responsive solely to said movement for imparting a predetermined lateral movement to the tool simultaneously with its advance movement to profile the article.

14. In an article forming apparatus, means for supporting and continuously rotating an article, a tool holder, a forming tool thereon, means for supporting the tool holder for reciprocation laterally of the article, means for advancing the supporting means longitudinally of the article, means for simultaneously effecting a reciprocable lateral movement to the tool holder upon the supporting means during its advance to cause an operative engagement of the tool with the peripheral surface of the article for predeterminedly profiling the same, said means comprising a cam rider fixed to the tool holder, a cam rotatably mounted on the supporting means and engaging the cam rider, a stationary element having a screw threaded aperture, and a screw threaded member operatively engaging in the aperture of the stationary element and connected to the cam, said stationary element and screw threaded member cooperating in response to a longitudinal movement of the tool supporting means for imparting a rotary motion to the cam.

15. In an article forming apparatus, means for supporting and rotating an article, a forming tool, a carrier for said tool, means for supporting and moving said carrier with said tool longitudinally of the article and simultaneously imparting a movement of the tool on the carrier radially of the article into operative engagement therewith, means carried by said tool carrier for axially engaging the article to support the same during the operation of said tool thereon, and means for mounting said tool carrier on its supporting and moving means so that the carrier may freely move in response to slight inaccuracies in the position of the article when said article supporting means on said tool carrier engages an article, whereby said tool is constantly maintained in a predetermined working alinement with the article during the working thereof.

16. In an article forming apparatus, a forming tool, means for moving an article into operative relation with respect to said tool, and means including a pair of pivotal spring pressed jaws normally spaced a predetermined distance apart between which said article is moved, said jaws positioned in advance of said tool and under the control of said article during its said movement towards said tool for controlling the operation of said tool.

KASPER F. MOLLER